United States Patent [19]

Washizuka et al.

[11] Patent Number: 4,655,551

[45] Date of Patent: Apr. 7, 1987

[54] LIQUID CRYSTAL DISPLAY WITH CHIP PROJECTING ABOVE AND BELOW FLEXIBLE FILM

[75] Inventors: Isamu Washizuka; Masuaki Morino, both of Soraku; Tamaki Mashiba, Yamatokoriyama, all of Japan

[73] Assignee: Sharp Kabushiki Kaisha, Osaka, Japan

[21] Appl. No.: 689,343

[22] Filed: Jan. 7, 1985

[30] Foreign Application Priority Data

Jan. 13, 1984 [JP] Japan ................... 59-4960

[51] Int. Cl.⁴ .................. G02F 1/133; H01L 31/08
[52] U.S. Cl. ..................... 350/334; 350/336; 339/17 LM
[58] Field of Search ............. 350/334, 336; 339/17 F, 339/17 CF, 17 LM, 17 L, 60 M, 63 M, 17 LC; 368/242

[56] References Cited

U.S. PATENT DOCUMENTS

| | | | |
|---|---|---|---|
| 3,836,824 | 9/1974 | Watrous | 339/17 F X |
| 4,042,861 | 8/1977 | Yasuda et al. | 339/17 F X |
| 4,116,517 | 9/1978 | Selvin et al. | 339/17 F |
| 4,243,455 | 1/1981 | Shiba et al. | 350/336 |
| 4,514,042 | 4/1985 | Nukii et al. | 350/332 X |

FOREIGN PATENT DOCUMENTS 1766162  4/1968  Fed. Rep. of Germany .... 339/17 F

*Primary Examiner*—John K. Corbin
*Assistant Examiner*—David Lewis
*Attorney, Agent, or Firm*—Birch, Stewart, Kolasch & Birch

[57] ABSTRACT

An arrangement of a liquid crystal display unit includes a display panel having a plurality of terminals, a plurality of flexible films made of electrically nonconductive material and an LSI chip bonded into each flexible film. A plurality of electrodes are deposited on each film, with the films being provided in association with the display panel to electrically connect each LSI chip with the display panel terminals.

12 Claims, 11 Drawing Figures

VIEWING
DIRECTION

LIQUID CRYSTAL DISPLAY WITH CHIP PROJECTING ABOVE AND BELOW FLEXIBLE FILM

BACKGROUND OF THE INVENTION

1. Field of the Invention

The present invention relates to a liquid crystal display unit and, more particularly, to an arrangement and connection of IC chips that define a drive circuit for the display unit.

2. Description of the Prior Art

Recently, pocket-size computers and portable computers have been developed. Such a computer often has a liquid crystal display unit which is defined by a liquid crystal multi-dot display element and a drive circuit for driving the display element. The liquid crystal multi-dot display element generally has a plurality of dots aligned in a matrix format, enabling the display of various characters and symbols through on/off control of the dots. The drive circuit for such a display is formed by a plurality of IC chips, such as LSI chips. The liquid crystal multi-dot display element therefore requires numerous terminals, in the order of hundreds, which are aligned along the side of the element with a predetermined narrow pitch. The drive circuit also has a corresponding number of terminals which are electrically connected to the display element terminals.

According to the prior art, the LSI chips are mounted on a circuit board made of a non-flexible hard material and, therefore, it is necessary to provide a relatively large space for installing the circuit board at a position neighboring the multi-dot display element. This results in a bulky liquid crystal display unit.

Furthermore, according to the prior art, the circuit board is provided with numerous terminals aligned with a predetermined pitch, so that when the circuit board is placed at its position adjacent the multi-dot display element, the terminals on the circuit board can be electrically connected to the corresponding terminals on the display element. However, since the terminals on the circuit board and display element are aligned within a narrow space, the positioning of the circuit board is very difficult. If the circuit board moves a little, the terminals on the circuit board may not be connected to the proper terminals on the display element.

Moreover, according to the prior art, the terminals on the circuit board and those on the display element must be formed with high accuracy. Otherwise, some terminals may fail to connect with the corresponding terminals, even if the circuit board is positioned properly.

SUMMARY OF THE INVENTION

The present invention has been developed with a view to substantially solving the above described disadvantages and has for its essential object the provision of a liquid crystal display unit wherein an improvement is made to an arrangement and connection of IC chips that define a drive circuit for the display unit.

It is also an essential object of the present invention to provide a liquid crystal display unit wherein the IC chips for the driving circuit can be installed in a narrow space adjacent to the display unit.

It is a further object of the present invention to provide a liquid crystal display unit which is compact in size and can readily be manufactured at low cost.

In accomplishing these and other objects, an arrangement of a liquid crystal display unit according to the present invention comprises a display panel having a plurality of terminals, a plurality of flexible films made of electrically non-conductive material and an LSI chip carried on each flexible film. A plurality of electrodes are deposited on the film, and the films are provided in association with the display panel so as to electrically connect the LSI chip with the terminals.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENTS

Figure 1:
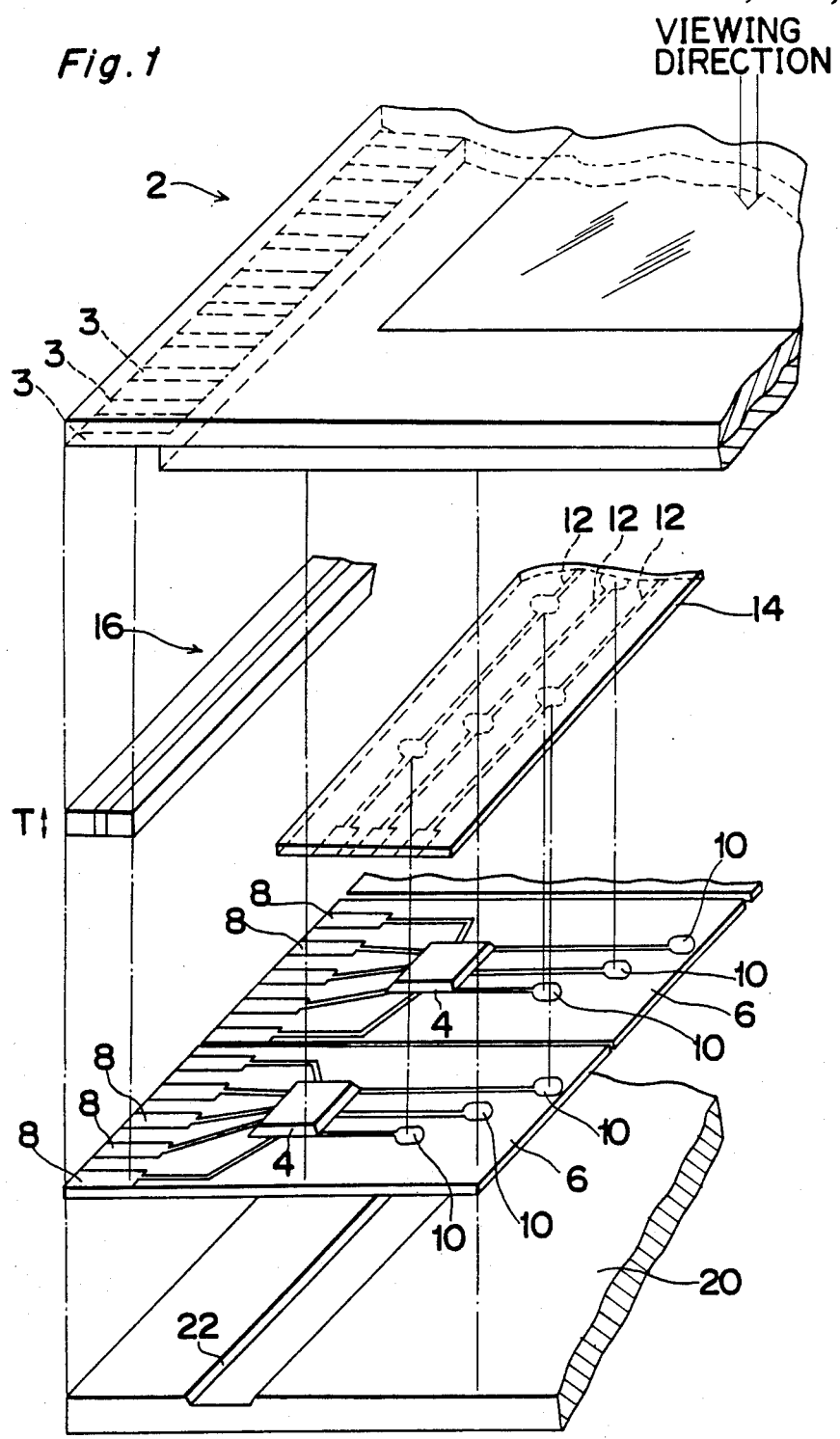
FIG. 1 is a perspective view of a liquid crystal display unit according to a first embodiment of the present invention.

Referring to FIG. 1, a liquid crystal display unit according to a first embodiment of the present invention is shown. The liquid crystal display unit has a liquid crystal multi-dot display panel 2 defined by two layers of transparent plates, such as glass plates, and a liquid crystal arrangement (not shown) sandwiched therebetween. Display panel 2 can be viewed in the direction indicated by an arrow. Extending from the liquid crystal arrangement are a plurality of terminals 3 which are aligned along a tiered edge.

Figure 2:
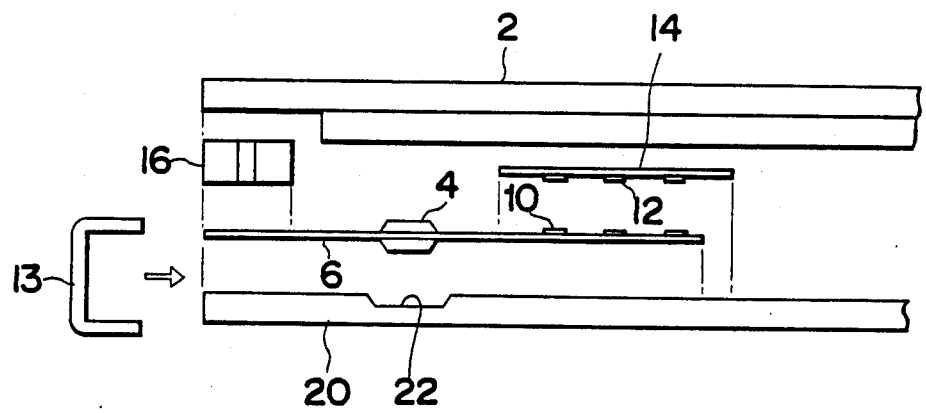
FIG. 2 is a side elevational view of the liquid crystal display unit of FIG. 1.

A drive circuit for driving the liquid crystal arrangement is formed by IC chips, such as LSI chips 4, each of which is carried by a flexible film 6. It is to be noted that each LSI chip 4 is a so-called film carrier type and is firmly carried on a separate sheet of film 6, through a known step, such as an inner bonding step. Thus, the LSI chip 4 projects above and below the flexible film 6, as best shown in FIG. 2. Flexible films 6 are positioned side-by-side and located immediately under display panel 2. Each flexible film 6 has a predetermined pattern of electrodes 8 and 10 deposited thereon which extend from the LSI chip 4. Electrodes 8 are aligned along one side of film 6 and are provided for sending signals to the liquid crystal arrangement in a manner which will be described later. Electrodes 10 are deposited at different distances from the LSI chip 4, and are provided for receiving electric power and various data signals from a bus structure described below.

The bus structure, according to the first embodiment, is formed by three parallel line electrodes 12 deposited on an elongated flexible film 14. Each line electrode has widened plates 12a disposed with a predetermined pitch. The widened places 12a on three lines 12 do not align with each other, but are in an offset relation. Flexible film 14 is provided on the aligned flexible films 6 such that widened places 12a are electrically connected to electrodes 10 on films 6 through a suitable connecting means, such as bonding or soldering. Accordingly, short electrodes 10 on films 6 are connected to each other. Similarly, intermediate electrodes 10 and long electrodes 10 are also connected to each other, respectively.

An elongated unidirectional conductive rubber sheet 16 is provided between an array of electrodes 3 on display panel 2 and an array of electrodes 8 on flexible film 6. Rubber sheet 16 has such a feature that it permits electric conduction only in its thickness direction T. Accordingly, electrodes 3 are electrically connected to corresponding electrodes 8.

Provided under the flexible films 6 is a base plate 20 which has a groove 22 formed therein so as to receive the projecting portion of each LSI chip 4.

Referring to FIG. 2, flexible films 6 provided with flexible film 14 and rubber sheet 16 are fixedly supported between panel 2 and base plate 20 by U-shaped holders 13 (only one is shown in FIG. 2) which are pressure fitted at opposite ends of the display unit. It is to be noted that the end portion of elongated flexible film 14, particularly the side deposited with electrodes 8, are uncovered, so as to permit the external electric connection to electrodes 8. The signals transmitted through electrodes 8 are applied to LSIs 4, each of which produces a particular signal for driving particular segment or segments. The signal produced from each LSI 4 is transmitted from terminals 8 through rubber sheet 16 to terminals 3 and further to the liquid crystal arrangement.

Figure 3:
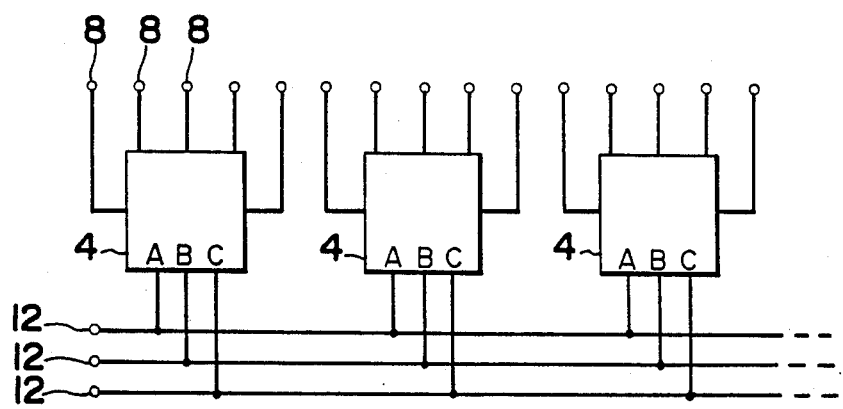
FIG. 3 is a circuit diagram of an electrode pattern employed in the liquid crystal display unit of FIG. 1.

Referring to FIG. 3, a circuit diagram of the electric connection between the bus structure and LSIs 4 is shown. As apparent from FIG. 3, the alignment of terminals A, B and C of LSI chips 4 is the same through all the LSI chips 4. Thus, the same type of LSIs 4 are employed.

Figure 4:
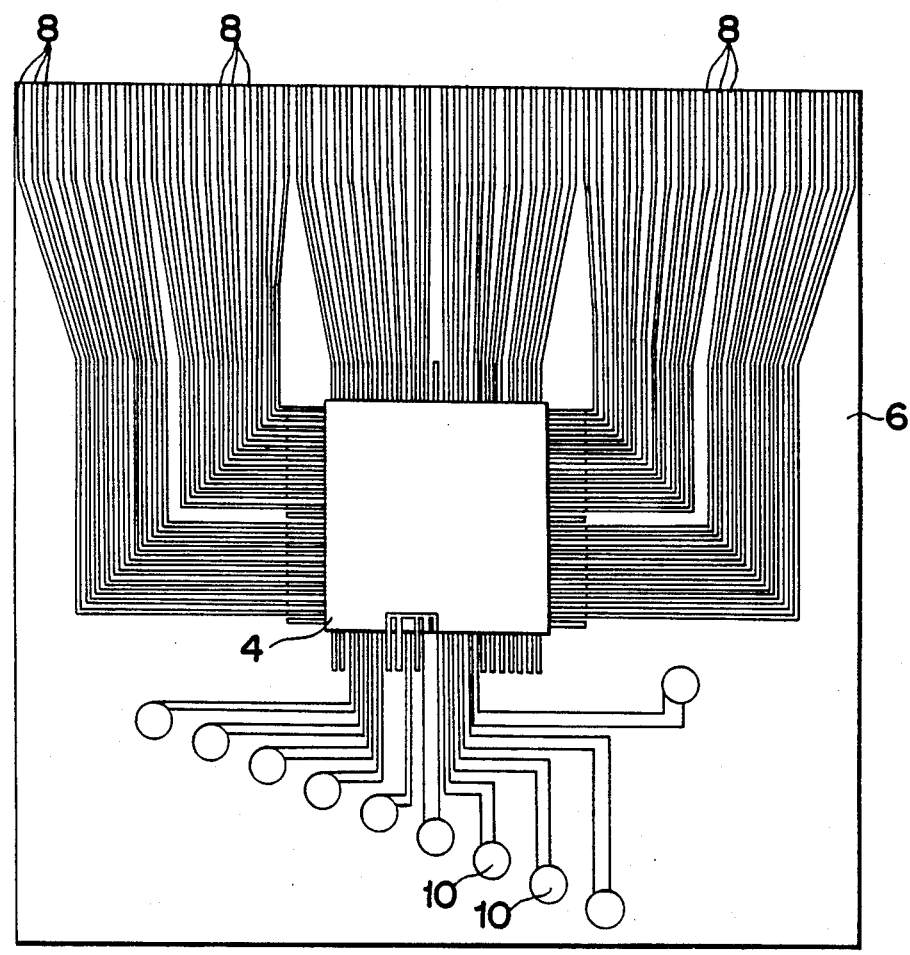
FIG. 4 is a top plan view of a printed circuit film employed for the first embodiment showing a pattern of electrodes extending from an LSI.
Figure 5:
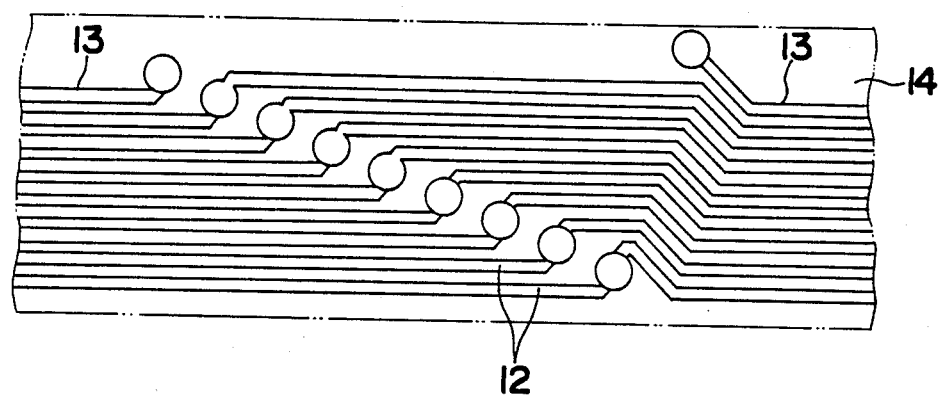
FIG. 5 shows a pattern of common electrodes.
Figure 6:
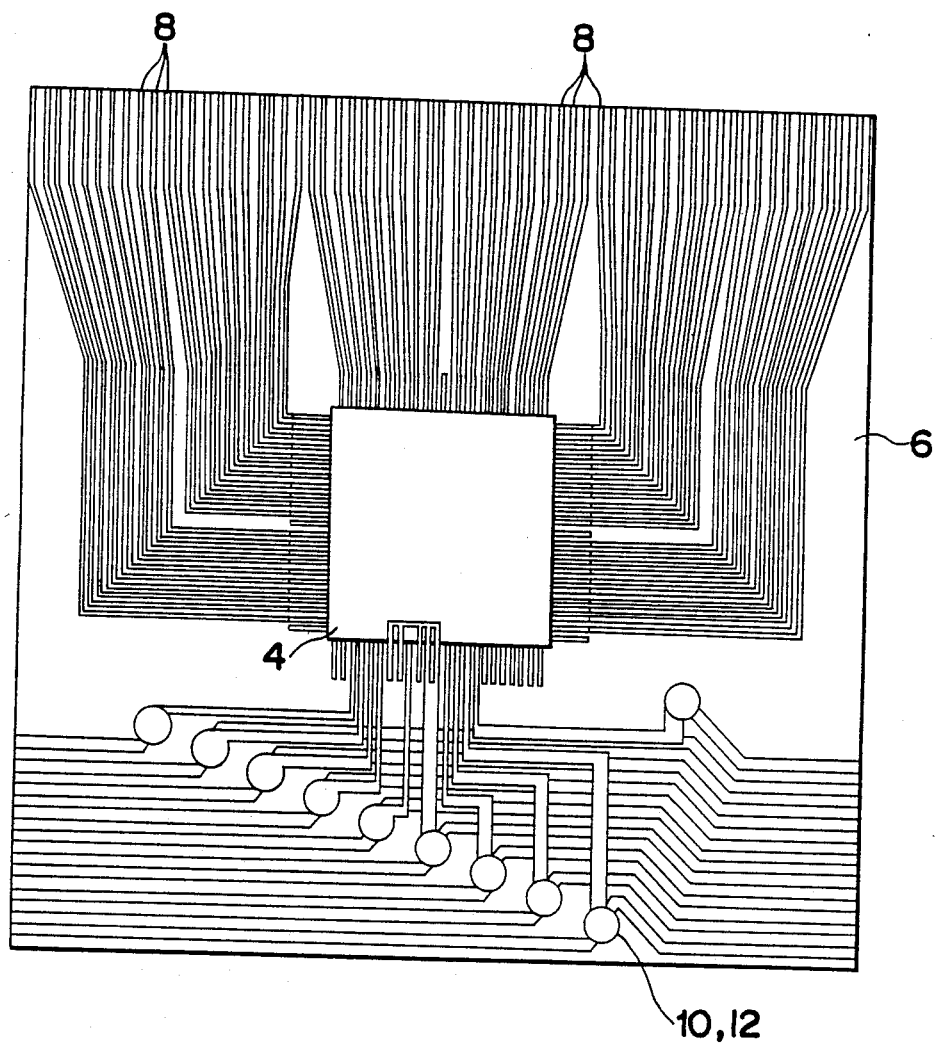
FIG. 6 shows the pattern of FIG. 4 overlapped with that of FIG. 5 so as to effect the electric connection between certain terminals on the electrode pattern of FIG. 4 and those on the electrode pattern of FIG. 5.

In the embodiment shown in FIGS. 1 through 3, there are five terminals 8 extending from LSI chip 4 for connection with the liquid crystal arrangement, and three terminals 10 for connection with the bus line. The number of the terminals is not limited to the above-described embodiment but can be any other number. For example, according to one model of LSI, there are sixty-four terminals 8 for connection with the liquid crystal arrangement and eight terminals 10 for connection with the bus lines. An electrode pattern on film 6 for the above-described model of LSI is shown in FIG. 4, and an electrode pattern on film 14 for the bus structure employed therefor is shown in FIG. 5. As indicated in FIG. 5, additional lines 13 are provided on film 14 for connection with the neighboring LSI chips. FIG. 6 shows a manner in which the electrode pattern of FIG. 4 is overlapped with the electrode pattern of FIG. 5.

Figure 10:
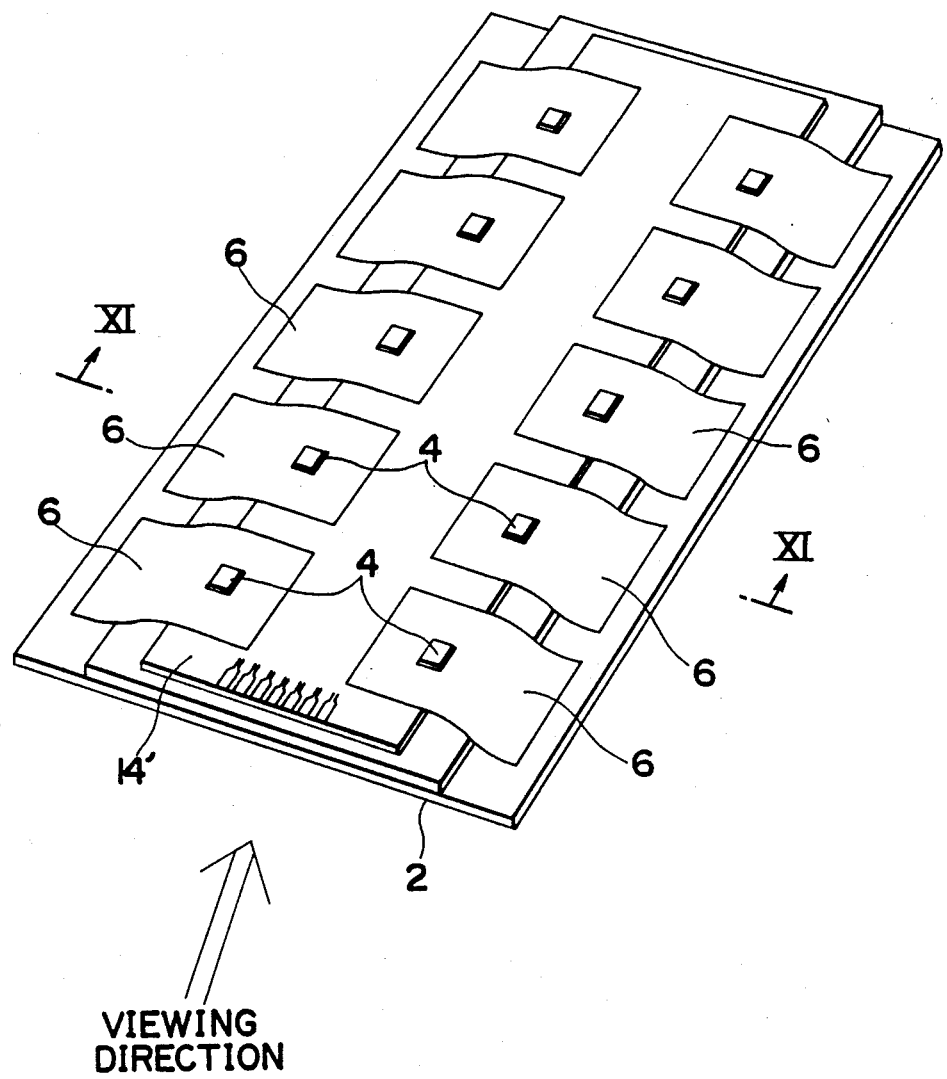
FIG. 10 is a perspective view of a liquid crystal display unit according to a third embodiment of the present invention, particularly showing the rear side thereof.

Furthermore, the flexible films, each carrying LSI chip 4, may be provided on the other side (not shown) of panel 2, in a manner similar to that shown in FIG. 10.

Figure 7:
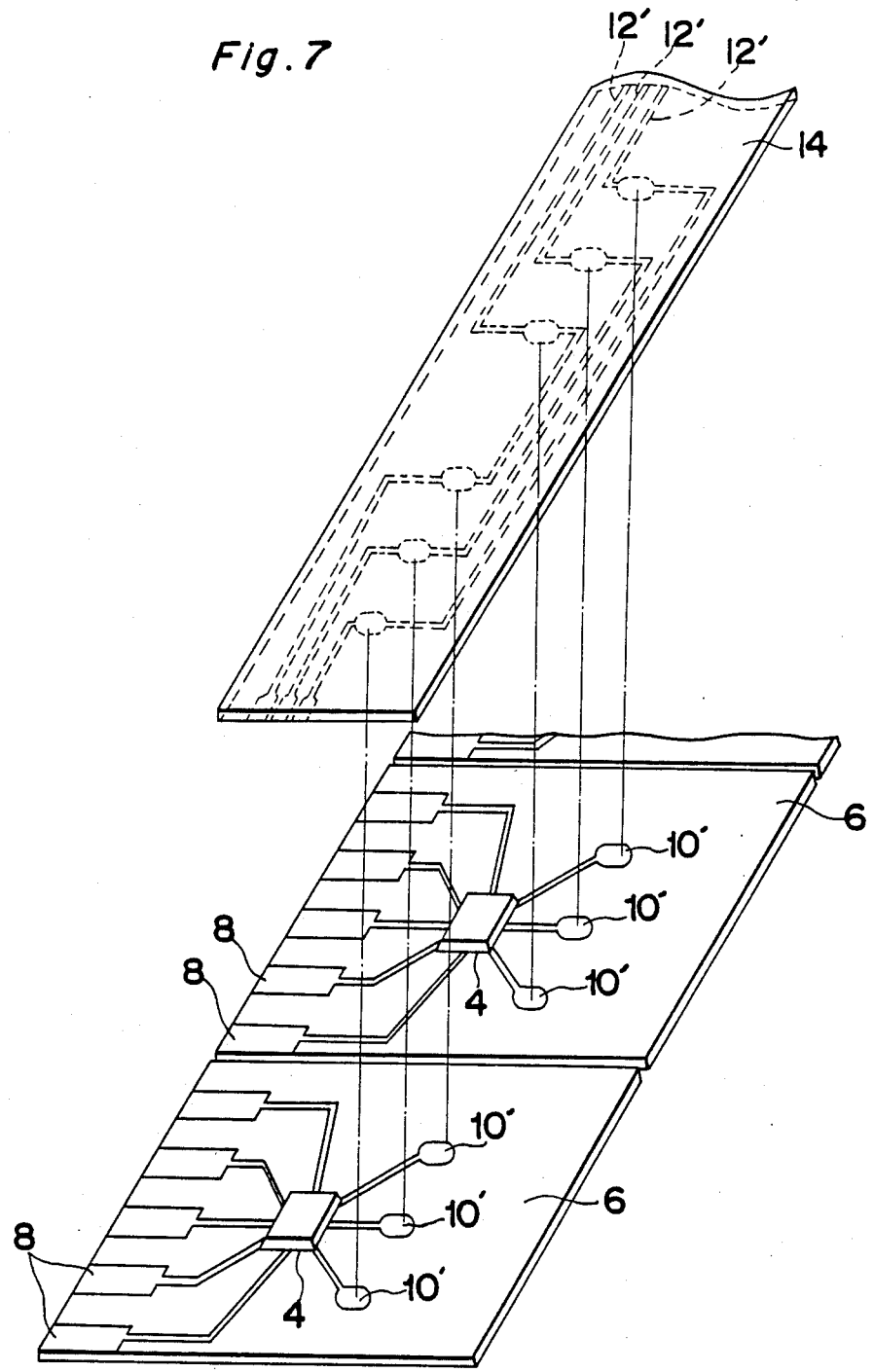
FIG. 7 is a perspective view of a liquid crystal display unit according to a second embodiment of the present invention, but particularly showing parts which differ from those of FIG. 1.

Referring to FIG. 7, a liquid crystal display unit according to a second embodiment of the present invention is shown. When compared with the first embodiment, the electrode patterns for the electric connection between LSI chips 4 and the bus structure is different. Electrodes 10' are so aligned that, when films 6 are aligned to form an array of terminals 8, as shown in FIG. 7, the terminal portions 10', as well as the terminal portions 12', for effecting the electric connection, e.g., by the deposition of solder beads, are aligned in a straight line. This arrangement is accomplished by extending the bus lines in S-formation. When this arrangement is employed, films 6 can be smaller than that of the first embodiment shown in FIG. 1.

Figure 8:
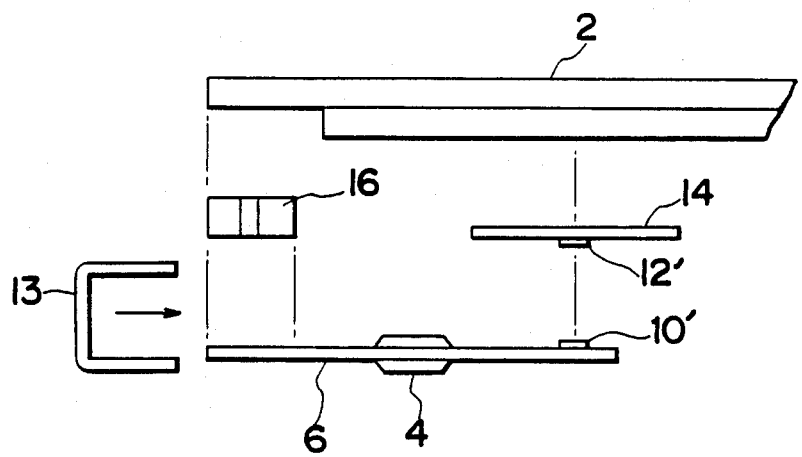
FIG. 8 is a side elevational view of the liquid crystal display unit of FIG. 7.

Referring to FIG. 8, the liquid crystal display unit of the second embodiment is not provided with the base plate 20. Thus, U-shaped holders 13 are pressure fitted to hold film 6 and panel 2 with the unidirectional conductive rubber sheet 16 inserted therebetween.

Figure 9:
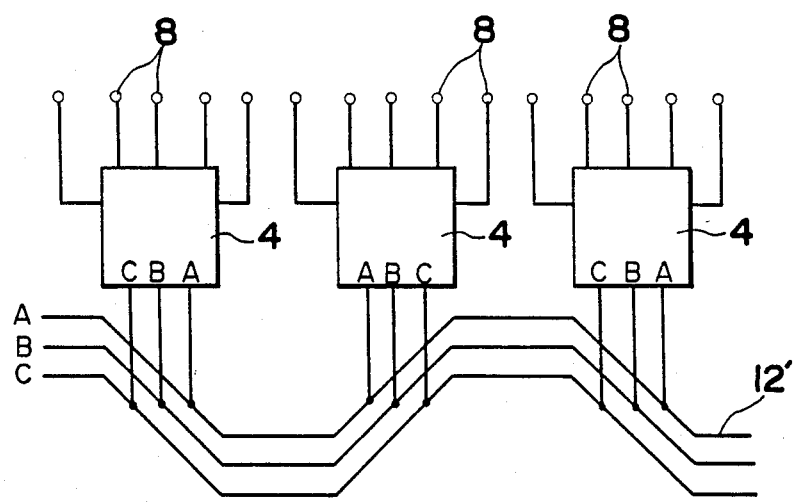
FIG. 9 is a circuit diagram of an electrode pattern employed in the liquid crystal display unit of FIG. 7.

Referring to FIG. 9, a circuit diagram of the electric connection between the bus structure and the LSIs 4 is shown. As apparent from FIG. 9, the alignment of terminals A, B and C of LSI chips 4 is either ABC or CBA and, therefore, two different types of LSIs 4 are employed.

Figure 11:
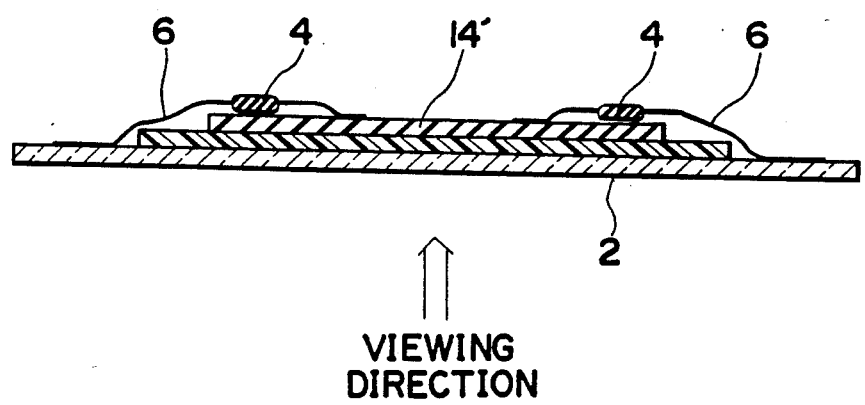
FIG. 11 is a cross-sectional view taken along a line XI—XI shown in FIG. 10.

Referring to FIG. 10, a bottom view of a liquid crystal display unit according to a third embodiment of the present invention is shown. FIG. 11 shows a cross sectional view taken along a line XI—XI shown in FIG. 10. When compared with the previous embodiments, the bus structure is formed by a hard circuit board 14'. Furthermore, in this embodiment, instead of using the unidirectional conductive rubber and holder 13, electrodes 8 and films 6 are directly connected to electrodes 3 of panel 2 through a suitable known method, such as a heat seal method. Moreover, instead of soldering, electrodes 10 and electrodes 12 can be connected also through a heat seal method.

According to the present invention, since the films 6 are separated from each other, the positioning of each film 6 can be accomplished easily so that terminals 8 on every film 6 can be properly connected to the corresponding terminals 3 on panel 2.

Furthermore, since films 6 are formed by flexible material, they can be provided in the least necessary space, resulting in a compact size display unit.

According to the second embodiment, since the electric connection between electrodes 10 and electrodes 12 can be accomplished along a straight line, film 6 can be very small in size.

According to the third embodiment, since electrodes 8 and corresponding electrodes 3 are directly connected to each other, the electric connection therebetween can be accomplished with high reliability.

Furthermore, when the electric connections are accomplished through heat seal method, there will be hardly any heat expansion or heat contraction of film 6, resulting in the simple positioning of the films 6.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. An arrangement of a liquid crystal display unit comprising:
   a display panel having a plurality of terminals;
   one or more flexible film assemblies, each said flexible film assembly including,
      a flexible film made of electrically non-conductive material, and
      an integrated circuit chip bonded within said flexible film, said integrated circuit chip projecting above and below said flexible film; and
   means for electrically connecting said integrated circuit chip with said terminals.

2. An arrangement as claimed in claim 1, further comprising a base plate having a groove therein for receiving a portion of said large scale integrated circuit chips projecting below said flexible films.

3. An arrangement of a liquid crystal display unit comprising:
   (a) a liquid crystal display panel having a plurality of first terminals;
   (b) a plurality of flexible film assemblies, each said flexible film assembly including,
      a flexible film made of electrically non-conductive material, and
      a large scale integrated circuit chip bonded within said flexible film and serving as a driving circuit for driving said liquid crystal display panel, said large scale integrated circuit chip projecting above and below said flexible film;
      a plurality of second terminals deposited on said flexible film and connecting with said large scale integrated circuit chip for sending signals from said large scale integrated circuit chip to said liquid crystal display panel;
      a plurality of third terminals deposited on said flexible film and extending from said large scale integrated circuit chip for receiving electric power and data signals to be supplied to said large scale integrated circuit chip;
      connection means for connecting said plurality of first terminals and said plurality of second terminals; and
   (c) a bus structure including a plurality of wirings supported by a flexible substrate connectable to each of said third terminals for supplying electric power and data signals to each said large scale integrated circuit chip.

4. An arrangement as claimed in claim 3, wherein said third terminals are disposed at different distances from said large scale integrated circuit chip.

5. An arrangement as claimed in claim 3, wherein said third terminals are aligned along a straight line.

6. An arrangement as claimed in claim 3, wherein said connection means includes a unidirectional electrically conductive rubber sheet positioned between said plurality of first terminals and said plurality of second terminals.

7. An arrangement as claimed in claim 3, wherein said bus structure includes a plurality of line electrodes deposited on a flexible film, said flexible film of said bus structure being positioned over said third terminals but not over said large scale integrated circuits.

8. An arrangement as claimed in claim 3, wherein said bus structure includes a plurality of line electrodes deposited on a hard circuit board, said plurality of line electrodes being directly connected to said third terminals.

9. An arrangement as claimed in claim 1, further comprising a base plate having a groove therein for receiving a portion of said integrated circuit chips projecting below said flexible films.

10. An arrangement as claimed in claim 7, further comprising U-shaped pressure fitted holders disposed at opposite ends of said liquid crystal display panel for fixedly positioning said plurality of first terminals, said plurality of flexible film assemblies, and said bus connection circuit.

11. A liquid crystal display unit comprising:
   (a) a liquid crystal display panel having a plurality of aligned display terminals;
   (b) a plurality of flexible film assemblies disposed in parallel to said liquid crystal display panel, said flexible film assemblies each including,
      a flexible film carrier of electrically nonconductive material,
      an integrated circuit chip bonded within said flexible film carrier so that a portion of said integrated circuit chip projects above said flexible film carrier and another portion of said integrated circuit chip extends below said flexible film carrier for providing a drive circuit which drives said liquid crystal display panel,
      a plurality of signal terminals extending from and being connected to said integrated circuit chip for providing signals from said integrated circuit chip to said display terminals of said liquid crystal panel, said plurality of signal terminals being positioned on said flexible film carrier in juxtaposition with said plurality of display terminals, and
      a plurality of power and data terminals extending from and being connected to said integrated circuit chip for receiving power and data signals to be supplied to said integrated circuit chip;
   (c) connection means for electrically connecting said signal terminals to said display terminals, said connection means being disposed between said signal terminals and said display terminals while allowing said integrated circuit chips to be positioned directly adjacent said liquid crystal display panel;
   (d) a bus structure including a plurality of wiring supported by a flexible film substrate, disposed between said liquid crystal display panel and said power and data terminals while allowing said integrated circuit chips to be positioned directly adjacent said liquid crystal display panel, for connecting said power and data terminals of each said flexible film assembly and supplying power and data signals thereto.

12. An arrangement of a liquid crystal display unit comprising:
   (a) a liquid crystal display panel having a plurality of aligned display terminals;
   (b) a plurality of flexible film assemblies, said flexible film assemblies each including,
      a flexible film carrier of electrically nonconductive material,
      an integrated circuit chip bonded within said flexible film carrier so that a portion of said integrated circuit chip projects above said flexible film carrier and a portion of said integrated circuit chip projects below said flexible film carrier for providing a drive circuit which drives said liquid crystal display panel, a plurality of signal terminals extending from and connected to said integrated circuit chip for providing signals from said integrated circuit chip to said display terminals of said liquid crystal display panel, a plurality of power and data terminals extending from and being connected to said integrated circuit chip for receiving power and data signals to be supplied to said integrated circuit chip;

(c) a bus structure including a plurality of wiring supported on a hard circuit board, disposed between said plurality of flexible film assemblies and said liquid crystal display panel, for connecting said power and display terminals of each said flexible film assembly to corresponding said power and data terminals of all other and flexible film assemblies and for supplying power and data signals thereto;

said pluralities of said power and data terminals being directly connected to said bus structure;

said pluralities of said signal terminals of said flexible film assemblies extending over said bus structure and being directly connected to said display terminals.

* * * * *